United States Patent [15] 3,674,677
Roberts [45] July 4, 1972

[54] ELECTRICALLY ENERGIZED PETROLEUM DE-EMULSIFIER

[72] Inventor: Robert J. Roberts, 9833 Moyers, Houston, Tex. 77042

[22] Filed: June 2, 1970

[21] Appl. No.: 42,624

[52] U.S. Cl. ............................................204/302, 204/188
[51] Int. Cl. ..........................................................B03c 5/02
[58] Field of Search .........................204/302–308, 188–191

[56] References Cited

UNITED STATES PATENTS

| | | | |
|---|---|---|---|
| 3,148,133 | 9/1964 | Turner | 204/306 X |
| 3,121,055 | 2/1964 | Carswell | 204/302 |
| 3,207,686 | 9/1965 | Jarvis et al. | 204/302 |
| 2,825,686 | 3/1958 | Greene et al. | 204/302 X |
| 3,148,134 | 9/1964 | Stenzel | 204/302 |

Primary Examiner—John H. Mack
Assistant Examiner—Neil A. Kaplan
Attorney—William E. Ford and James L. Jackson

[57] ABSTRACT

An electrically energized deemulsifier for separating the constituents of water-petroleum emulsions and the like includes an elongated generally horizontally disposed vessel having an emulsion inlet at one extremity and having a clean fluid discharge at the other extremity thereof. A drain is disposed at the lower portion of the vessel for draining separated fluid such as water.

Inflowing emulsion is distorted and deflected downwardly by a scrubber plate that is provided with a plurality of apertures adjacent the lower end thereof that evenly distribute the flow of emulsion and prevent channeling. As the incoming emulsion is turned downwardly by the scrubber plate, free droplets of water will gravitate to the bottom of the vessel. Coalescence of the emulsion is effected as the emulsion flows evenly in a horizontal direction through an electric field developed between spaced high voltage and ground electrodes within the vessel. The high voltage electrode is positively supported during transportation of the vessel and is adjustable to any desired position within the vessel by manipulation of external adjustments. Flashing of volatile products within the vessel is effectively prevented since the unique design of the vessel eliminates any vapor pockets that would present a flash hazard.

12 Claims, 9 Drawing Figures

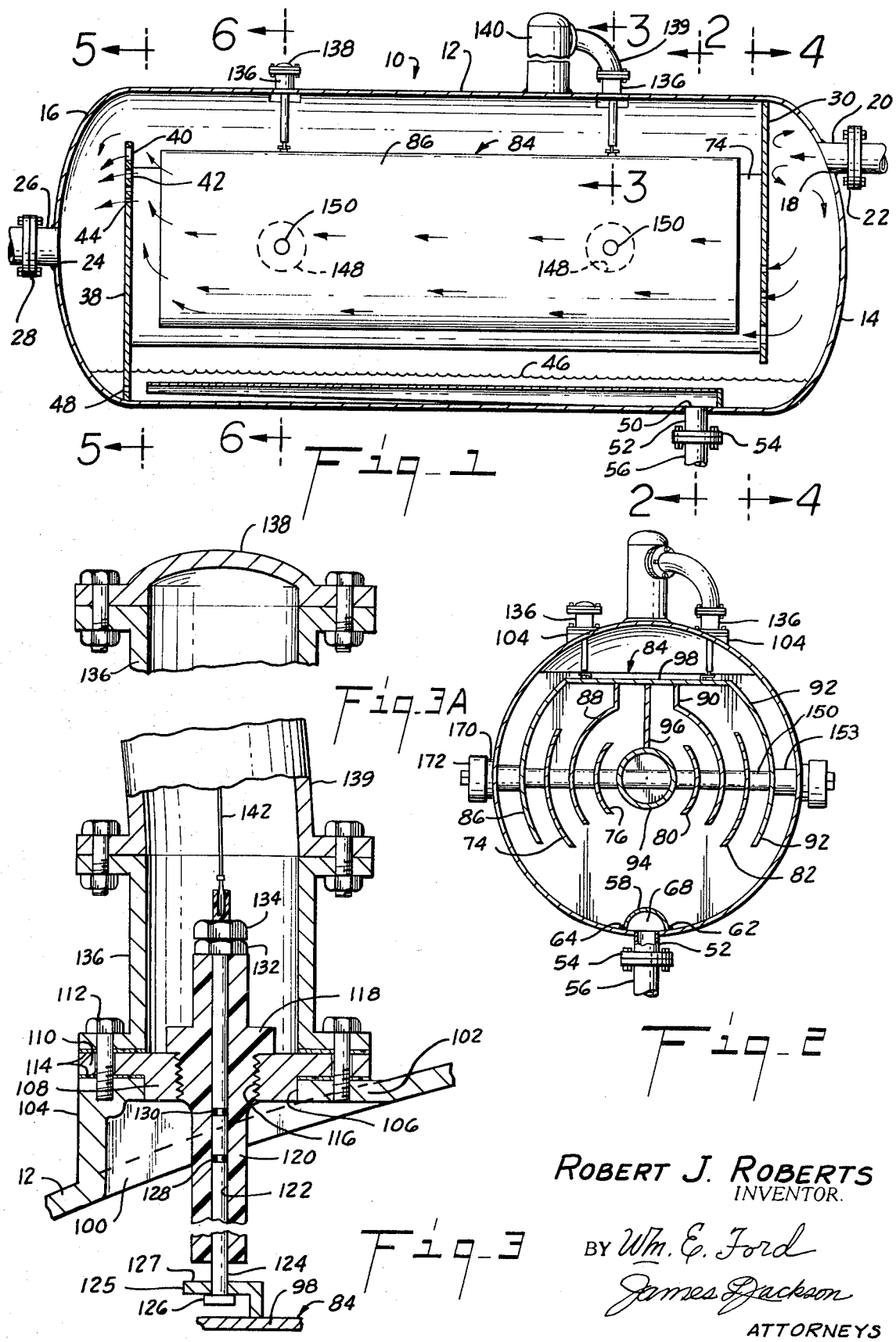

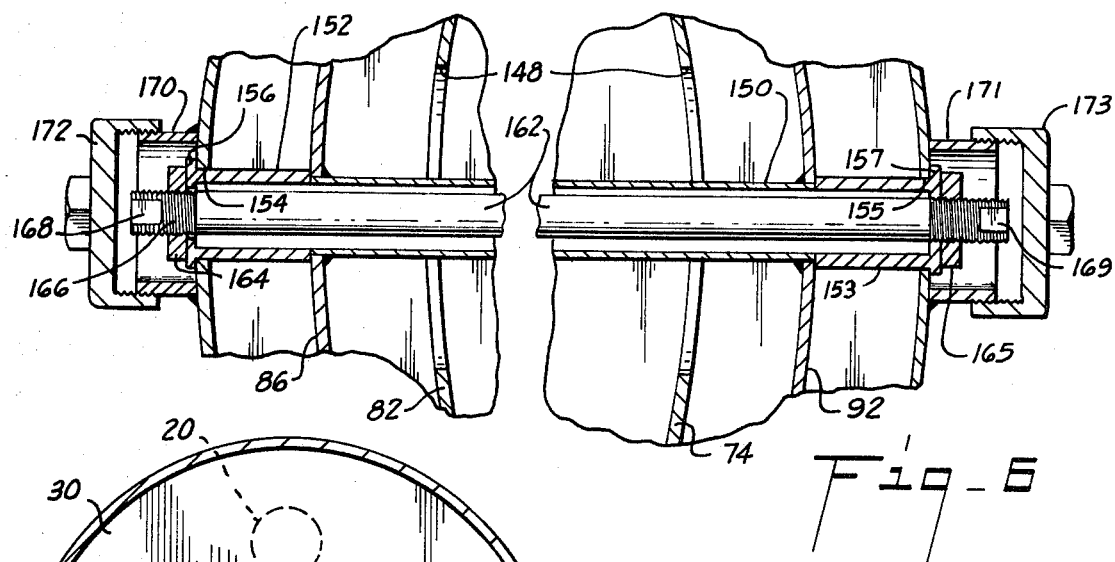
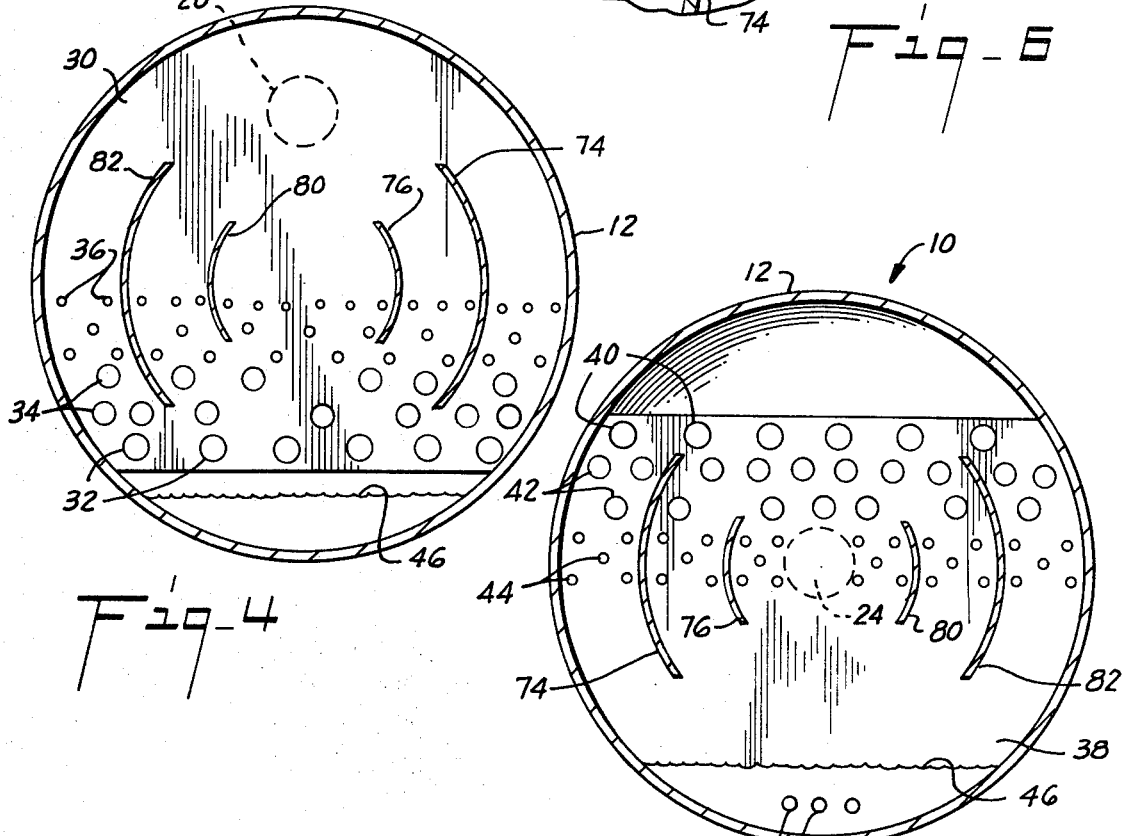
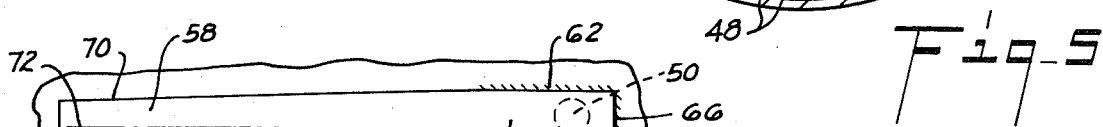
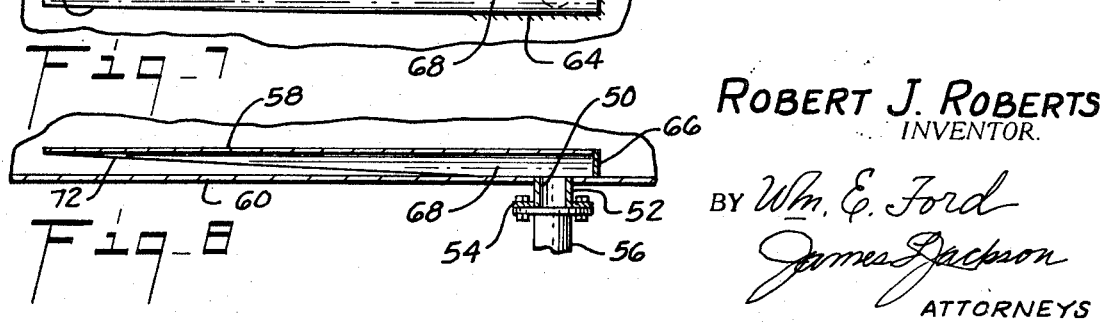

3,674,677

ELECTRICALLY ENERGIZED PETROLEUM DEEMULSIFIER

BACKGROUND OF THE INVENTION

Petroleum products produced from petroleum reservoirs generally emerge in the form of an emulsion including small particles of water that cannot be readily separated from the emulsion by gravity. Water may also be injected into flowing petroleum products to pretreat the products and create an emulsion under particular conditions. It is common practice to achieve separation of water particles from an oil-water emulsion by passing the emulsion through apparatus generally known as a deemulsifier or dehydrater where the emulsion is subjected to an electrical field that causes the water particles to coalesce into water droplets of sufficient size that separation by gravity is readily accomplished. As the emulsion is passed through the electrical field the small water particles are agitated, causing collision of the water particles which results in agglomeration of the particles into water masses of sufficient size to result in gravitation thereof.

Most electrically energized deemulsifiers are of substantial size so that fluid movement through the vessel is fairly slow thereby allowing the emulsion to be subjected to the electric field for periods of substantial duration. The electrical field generally serves only to assist the natural gravitation of the emulsion as the fluid moves slowly through the vessel.

Petroleum-water deemulsifier vessels are almost invariably disposed vertically thereby causing the coalesced gravitating water particles to move downwardly within a fluid that generally flows upwardly through the vessel structure. It is necessary, therefore, that the gravitating water particles move downwardly at a more rapid rate than the upward flow of the emulsion within the vessel to prevent the water particles from being carried with the flowing fluid through the vessel without being allowed to settle out. Obviously, the smaller of the water droplets will not settle sufficiently fast to oppose the flow of the fluid and, therefore, will be carried through the deemulsifier.

SUMMARY OF THE INVENTION

It is therefore a primary object of the present invention to provide a novel electrically energized deemulsifier that accomplishes optimum coalescence of the emulsion by subjecting the flowing emulsion to an intense electric field for a residence time of substantial duration.

It is an even further object of the present invention to provide a novel electrically energized deemulsifier that is capable of accomplishing substantially horizontal evenly distributed flow of emulsion through an electric field to eliminate any vertical flow component of the emulsion thereby allowing rapid coalescence and gravitation of water particles of minimal size.

Among the several objects of the present invention is noted the contemplation of a novel electrically energized deemulsifier that is capable of developing an extremely intense electrical field even though a substantially low operating voltage is employed thereby promoting optimum electrically induced coalescence of the emulsion.

It is another object of the present invention to provide a novel electrically energized deemulsifier including a vessel design that effectively eliminates potential flash hazards by providing vessel structure that prevents the development of vapor pockets.

It is an even further object of the present invention to provide a novel electrically energized deemulsifier that includes external structure for inspecting and adjusting internally disposed electrodes in order that proper evenly distributed field intensity may be effectively developed.

Another important object of the present invention contemplates the provision of a novel electrically energized deemulsifier that defines a tortuous flow path for emulsion flowing through the vessel in order to increase retention time within the vessel and at the same time effectively provides substantially horizontal evenly distributed flow of the emulsion through an electric field to provide for optimum emulsion coalescence and gravitation.

It is also an object of the present invention to provide a novel electrically energized deemulsifier including means to provide positive support for the high voltage electrode during shipment of the vessel in order to prevent damage thereto.

Another object of this invention is the provision of a novel electrically energized deemulsifier that is of small size, low in manufacturing cost, and low in operating cost, in addition to being reliable in use for extensive periods of time.

The above and other objects and novel features of the instant invention will be readily apparent from the following description taken in conjunction with the accompanying drawings. It is to be expressly understood that the drawings are provided for the purpose of illustration and are not intended to define the limits of the invention, but rather merely illustrate a preferred embodiment and structure incorporating the features of the instant invention.

BRIEF DESCRIPTION OF THE DRAWINGS

In the accompanying drawings forming a part of this specification and wherein like reference numerals are employed to designate like parts:

FIG. 1 is a sectional view taken in elevation illustrating an electrically energized deemulsifier constructed in accordance with the present invention.

FIG. 2 is a transverse sectional view taken along line 2—2 in FIG. 1.

FIG. 3 is a fragmentary sectional view in elevation taken along line 3—3 in FIG. 1.

FIG. 3A is a fragmentary sectional view taken along line 6—6 in FIG. 1 and illustrating a hanger protector in detail.

FIG. 4 is a transverse sectional view in elevation taken along line 4—4 in FIG. 1 and illustrating the scrubber plate construction in detail.

FIG. 5 is a transverse sectional view in elevation taken along line 5—5 in FIG. 1 and illustrating the overflow discharge plate construction in detail.

FIG. 6 is a fragmentary sectional view taken along line 6—6 in FIG. 1 and illustrating the mechanism for securing the high voltage electrode to prevent damage to the same during transportation.

FIG. 7 is a fragmentary plan view illustrating the water drain and vortex preventer in detail.

FIG. 8 is a fragmentary sectional view illustrating the water drain and vortex preventer structure in elevation.

DETAILED DESCRIPTION OF THE PREFERRED EMBODIMENT

With reference now to the drawings for a better understanding of the present invention, in FIG. 1 an electrically energized deemulsifier for petroleum-water emulsions and the like, illustrated generally at 10, comprises a generally cylindrical vessel 12 having inlet and discharge end walls 14 and 16, respectively, that are of convex configuration. The inlet end wall 14 is provided with an inlet aperture 18 at the upper portion thereof about which is secured an inlet conduit 20 provided with a connection flange 22 for securing the conduit 20 to a flanged emulsion supply conduit. Obviously, any other acceptable means of establishing connection between the inlet conduit and supply conduit may be employed within the spirit and scope of the present invention. The discharge end wall 16 is provided with a centrally disposed discharge aperture 24 about which is secured a discharge conduit 26 provided with a flange 28 for establishing bolted connection with a clean product discharge conduit. Again, any other suitable type connection structure may be employed other than the bolted flange construction illustrated without departing from the spirit or scope of the present invention.

Within the vessel 12 is disposed a scrubber plate 30 that is secured by welding or the like to the top and side portions of the internal vessel walls and is spaced from the bottom portion of the vessel. The scrubber plate 30 is disposed with an imperforate portion located opposite the emulsion inlet aperture 18 in such manner that emulsion entering the vessel will be impacted directly against the solid portion of the scrubber plate. Impacting the emulsion against the scrubber plate distorts the channeling effect of the flowing fluid and imparts a downward component to the flow, thereby allowing larger free droplets of water to gravitate to the bottom of the vessel. The scrubber plate is provided with a plurality of apertures through which the emulsion flows as it moves toward the electric field with the deemulsifier. As illustrated in detail in FIG. 4, the apertures 32 at the lower extremity of the scrubber plate 30 are of substantial dimension while other apertures 34 are of smaller dimension. Yet smaller apertures 36 are provided just below the imperforate portion of the scrubber plate and cooperate with the other apertures 32 and 34 to further inhibit channeling and achieve even distribution of the emulsion as it enters the electrical field defined within the deemulsifying vessel. Channeling of the flowing fluid is therefore effectively eliminated by impacting of the emulsion against the scrubber plate to achieve initial distortion of any tendency of the fluid to channel in cooperation with the apertures 32, 34, and 36 which further resist any tendency of the fluid to become channeled as it flows through the vessel. Emulsion is also allowed to flow under the lower extremity of the scrubber plate 30, but such flow will generally be negligible since the combined apertures 32, 34 and 36 are of sufficient size to allow most of the emulsion to pass through the scrubber plate.

At the opposite extremity of the vessel 10 is disposed an overflow discharge plate 38 that is secured to the bottom and side portions of the vessel by welding or the like as is illustrated in detail in FIG. 5. The overflow discharge plate 38 is also provided with a plurality of apertures 40, 42, and 44 of varying dimension. The larger apertures 40 are located at the upper portion of the overflow discharge plate with slightly smaller apertures 42 disposed immediately below the large apertures. Yet smaller apertures 44 are disposed at the lower portion of the overflow discharge plate but substantially above the maximum water level 46 within the vessel. In order to allow drainage of any water that might collect outwardly of the overflow discharge plate 38 at least one and preferably a plurality of small apertures 48 are formed in the overflow discharge plate substantially below the maximum water level 46.

For the purpose of draining precipitated water or other fluid from the lower portion of the deemulsifier 10, an aperture 50 is formed in the bottom of the vessel 12 adjacent one extremity thereof and communicates drained fluid to a drain conduit 52. The drain conduit is provided with a flange 54 that is adapted for bolted connection to a flanged conduit 56 that transports water away from the vessel 10.

As illustrated in detail in FIGS. 7 and 8, an elongated vortex preventer 58 is secured to the bottom wall 60 of the vessel 12. The vortex preventer 58 is of curved cross section as clearly shown in FIG. 2 and is secured at two side edges to the bottom wall 60 of the vessel 12 by welds 62 and 64 that extend a substantial distance beyond the drain aperture 50. The vortex preventer 58 is also provided with a closed end wall 66 that cooperates with the welded connection between the vortex preventer and the bottom wall 60 of the vessel to define an elongated chamber 68 through which precipitated fluid must flow in order to reach the drain aperture 50. The vortex preventer is also provided with tapered surfaces 70 and 72 that cooperate with the bottom wall 60 of the vessel to define an elongated opening of considerable dimension through which precipitated fluid flows in order to reach the elongated chamber 68. The precipitated fluid, therefore, will move gradually from a substantial area of the vessel into the elongated chamber to the drain aperture 50 thereby preventing any tendency of the fluid to create a condition of vortexing that would otherwise interfere with smooth horizontal movement of the emulsion through the electric field within the vessel. This feature effectively prevents a vortexing action from drawing a portion of the emulsion directly into the drain.

With reference now particularly to FIGS. 1 and 2 of the drawings, a plurality of concentrically curved ground electrodes 74, 76, 80, and 82 are disposed within the vessel 10 and are secured by welding or the like in immovable assembly to the scrubber plate 30 and the overflow discharge plate 38. The curved ground electrodes, in addition to assisting in the electrical function of the deemulsifier, also contribute substantially to the structural integrity of the vessel. The curved plates are substantially stronger than flat plates of similar surface area. A high voltage electrode illustrated generally at 84 is suspended within the vessel and includes a plurality of concentrically curved high voltage plates 86, 88, 90, and 92 that are interposed between the ground electrode plates or interposed between the ground electrode plates and the outer wall 12 of the vessel which obviously is also electrically connected to ground. A centrally disposed high voltage cylinder 94 is connected by a substantially planer plate 96 to the upper horizontal wall 98 of the high voltage electrode 84. The high voltage cylinder 94 is closed at both of its extremities in order to prevent isolation of a portion of the vessel from the electrical potential developed between the high voltage and ground electrodes.

With reference now particularly to FIG. 3 the vessel 12 is provided with a plurality of apertures 100 into which are welded or otherwise fixed substantially planar horizontally and vertically disposed structural walls 102 104, respectively. The vertical and horizontal walls 102 and 104 define pockets that are open toward the upper portion of the vessel 12. This feature effectively prevents any accumulation of vapor within the electrode support pockets of the vessel that otherwise might contribute to flashing in the event the fluid within the vessel is of volatile nature. The horizontal wall 102 is provided with an aperture 106 within which fits a reduced diameter portion 108 of a support flange 110 that is connected to the wall 102 by bolts 112. Any suitable sealing means such as gaskets 114 is employed to establish a sealed relation between the wall 102 and the support flange 110. Internal threads 116 are provided in the support flange 110 in order to threadedly receive an externally threaded support portion 118 of a structural sleeve 120 of plastic material such as polytetrafluoroethylene or any other suitable plastic material having good structural integrity. The insulating sleeve 120 is provided with an internal bore 122 through which is extended an electrically conductive hanger member 124. The hanger member 124 is provided with an enlarged head 126 that is received by a bifurcated support element 125 fixed to the upper portion 98 of the high voltage electrode 84. O-rings 128 and 130, or any other suitable sealing elements, are received within appropriate grooves formed in the hanger 124 and serve to establish a positive fluid tight seal between the hanger and the insulating sleeve 120. The upper portion of the hanger 124 is threaded and is received by cooperating support and lock nuts 132 and 134 that allow the hanger to be raised or lowered to adjust the position of the high voltage electrode 84 within the vessel 12. A hanger support protector 136 is secured to the support flange 110 by the bolts 112 and includes a closure 138, best illustrated in FIG. 3A, that is bolted or otherwise fixed thereto in order to protect the hanger structure from damage or tampering and to provide for proper isolation of the electrical current from the ground electrodes and the vessel structure. As illustrated in FIGS. 1 and 3, a flanged elbow conduit 139 is bolted to one of the support protectors 136 and to a flanged aperture formed in a power supply 140. An electrical conductor extends from the power supply through the elbow conduit in spaced relation with the walls thereof and is connected in any suitable manner to the upper extremity of the hanger 124. Transformer oil or other insulating substance completely fills the power supply and the elbow conduit. The remaining support protectors or headers are also filled with transformer oil or the like to achieve proper insulation. As illustrated in FIGS. 1 and 2 only one of the hanger supports will be electrically connected between the power supply and the high voltage electrode. The remaining three insulated hangers will be secured against damage or tampering by a hanger protector 136 provided with a closure 138.

In order to provide for positive support of the suspended high voltage electrode 84 during shipment of the deemulsifier 10 and to provide for inspection of the alignment of the high voltage electrode, the ground electrodes are illustrated in FIG. 6 as having enlarged apertures 148 through which a structural tube 150 extends to prevent distortion of the electric field between the ground and high voltage electrodes. The structural tube 150 is secured by welding or the like to each of the curved plates 86, 88, 90 and 92 and to the cylinder 94 thereby providing a tubular passage that extends through both the high voltage and ground electrodes. To positively secure the high voltage electrode 84 against movement during shipment, identical tubular sleeves 152 and 153 are extended through apertures 154 and 155, respectively, formed in the vessel 12. The sleeves are provided with flanges 156 and 157, respectively, that seat against the external wall of the vessel when installed. The sleeves 152 and 153 are of sufficient length to extend into the vessel and engage the outer surface of the tube 150 or to engage the high voltage electrode plate 86 or 92 as the case may be. A locking bar 162 is extended through the tube 150 and is secured into position by lock nuts 164 and 165. The lock nuts 164 and 165 are secured to the locking bar 162 and are manually adjusted to restrain the high voltage electrode in immovable relation with respect to the external wall and ground electrodes of the vessel. The locking bar 162 is provided with flats 168 and 169 to prevent rotation of the locking bar while the nuts 164 and 165 are being adjusted. Closure collars 170 and 171 are secured by welding or the like to the external wall of the vessel, as illustrated in FIG. 6 and are provided with external threads to receive the internal threads of cover members 172 and 173 that are employed to close the vessel subsequent to installation thereof.

After the deemulsifier 10 has been shipped to the ultimate location thereof, the closures 172 and 173 will be removed and one of the lock nuts 164 or 165 will be unthreaded to release the bias applied to the internal high voltage electrode during shipment thereof. The locking bar then is removed allowing the high voltage electrode 84 to be freely suspended within the vessel by the electrode hangers as described above. The sleeves 152 and 153 will also be removed thereby preventing any structural interconnection between the external wall of the vessel and the high voltage electrode. The position of the high voltage electrode may then be adjusted by raising or lowering the same or by leveling the same through use of adjusting nuts 132 and 134 on each of the hangers. The position of the high voltage electrode may be measured through the access openings 154 and 155 to assure positive alignment of the suspended high voltage electrode with the fixed ground electrodes.

The curved interrelated high voltage and ground electrode plates and the structural support members of the high voltage electrode 84 effectively serve to provide substantial electrode area that is disposed in substantially horizontal relation within the deemulsifier vessel and effectively defines sufficient plate area such that an extremely dense electrical field is produced utilizing a power source of nominal operating voltage. In addition, the curved electrode plates provide substantial structural integrity to the high voltage electrode. Moreover, the electrical field is horizontally disposed within the vessel and the flow of emulsion is of moderate velocity and is relatively smooth and undisturbed through the vessel in horizontal manner thereby providing longer residence time of the emulsion in the electrical field even though the vessel defining the invention is of limited size. Horizontal flowing of the emulsion through the vessel also effectively allows the emulsion to coalesce and allows even the smallest of water droplets to fall out of suspension because the flow of the emulsion has no vertical component until the emulsion substantially reaches the end of the electrical field. The deemulsifier will therefore tend to function more efficiently thereby producing a production fluid of purer character than is ordinarily achieved through the utilization of much larger electrically energized deemulsifiers.

In view of the foregoing, therefore, it is readily apparent that I have produced a novel electrically energized deemulsifier that is capable of achieving preliminary coalescence of the emulsion by impacting the same against a scrubber plate before the emulsion enters the electrical field defined within the deemulsifier vessel. The invention effectively achieves a smooth flow of the emulsion through the electrical field because any tendency of the fluid to channel is eliminated by the plurality of apertures in the scrubber plate and overflow discharge plate through which the emulsion must flow during treatment. The invention utilizes solid electrode plates that do not create voids in the electrical field that are usually present when rods, tubes, or screens are utilized to provide the electrical field. The solid electrode plates effectively allow the development of an electrical field of substantial density even though the operating voltage of the deemulsifier is nominal. I have also provided an external means for inspecting and adjusting the insulators and electrode hangers and have provided an external means for measuring plate separation and alignment in order to assure proper operating capability at all times. Moreover, I have provided a deemulsifier system utilizing a suspended high voltage electrode that is positively supported during transportation to prevent damage thereto. It is readily understood therefore that my invention is well adapted to attain all of the objects and advantages hereinabove set forth together with other objects and advantages that are inherent in the apparatus itself. While certain representative embodiments and details thereof have been shown for the purpose of illustrating the invention it will be apparent to those skilled in the art that various changes and modifications may be made therein without departing from the spirit or the scope of my invention.

I claim:

1. An electrically energized deemulsifier comprising an elongated closed horizontally disposed vessel having inlet and discharge walls, a scrubber plate fixed within said vessel in spaced relation to the inlet wall thereof and depending from the upper portion of said vessel, the lower extremity of said scrubber plate being spaced from the bottom portion of said vessel, an emulsion inlet provided in the inlet wall of said vessel whereby emulsion entering said vessel will be impacted directly against said scrubber plate causing distortion of channeling of said emulsion, an overflow discharge plate fixed within said vessel and being disposed in spaced relation to the discharge wall of said vessel, said overflow discharge plate being disposed in spaced relation from the upper portion of said vessel, a plurality of elongated ground electrodes being secured to both said scrubber plate and said overflow discharge plate and being disposed in transversely spaced apart longitudinally parallel, substantially generally vertically extending relationship within said vessel, from scrubber plate to discharge plate, an elongated high voltage electrode and means suspending said high voltage electrode within said vessel, said high voltage electrode having a plurality of elongated electrode plates in transversely spaced apart, longitudinally parallel, substantially generally vertically extending relationship as suspended in substantially equally, transversely spaced apart disposition and substantially equally spaced apart between said ground electrodes, for almost the full length thereof and just short of said scrubber plate and said discharge plate, respectively, whereby fluid passage through said vessel is longitudinally along parallel channels and under continuous electric treatment across said substantially generally vertically extending, opposed high voltage plates and ground electrodes, respectively, an electrical power supply, means establishing electrical connection between said power supply and said high voltage electrode, a clean fluid discharge being provided in said discharge end wall, and a separated liquid drain being provided in the lower portion of said vessel.

2. An electrically energized liquid deemulsifier according to claim 1, said ground electrode plates being of arcuate vertical configuration, said high voltage electrode having a substantially horizontally disposed closed cylinder located centrally of said vessel and having a plurality of plates of arcuate configuration disposed substantially concentric with the horizontal axis of said cylinder, said ground electrode plates being of arcuate vertical configuration and being disposed in substantially concentric relation with the horizontal axis of said cylinder.

3. An electrically energized deemulsifier according to claim 1; a plurality of apertures formed in the lower portion of said scrubber plate causing even distribution of emulsion flowing therethrough.

4. An electrically energized deemulsifier according to claim 1; said vessel having a plurality of external electrode support projections, electrode hanger support means secured to said projections, a plurality of electrode hangers extending through said hanger support means and being connected at the lower extremity thereof to said high voltage electrode, means insulating said hangers from said vessel.

5. An electrically energized deemulsifier according to claim 4; said electrode support projections having a horizontal top wall and vertical side and end walls defining pockets open toward the interior of said vessel thereby preventing vapor from becoming trapped within said pockets which would otherwise create a flash hazard.

6. An electrically energized deemulsifier according to claim 4; means for adjusting the vertical position of said electrode hangers whereby said high voltage electrode may be adjusted to any desired position thereof within said vessel.

7. An electrically energized deemulsifier according to claim 1; said means suspending said high voltage electrode comprising a plurality of insulated hangers secured to the upper portion of said vessel and extending into said vessel, said hangers being secured to said high voltage electrode, said hangers being externally adjustable to provide for adjustment of the position of said high voltage electrode, at least one of said hangers having an electrical conductor therein and establishing electrical connection between said high voltage electrode and said power supply.

8. An electrically energized deemulsifier comprising an elongated closed substantially horizontally disposed vessel having an emulsion inlet at one extremity and a clean fluid outlet at the opposite extremity thereof, a drain at the bottom of said vessel for draining separated water therefrom, a plurality of ground electrode plates fixed within said vessel and in transversely spaced apart longitudinally parallel, substantially vertically extending relationship, a high voltage electrode being supported within said vessel and having a plurality of high voltage electrode plates in transversely spaced apart, longitudinally generally vertically extending relationship as disposed in substantially equally, transversely spaced apart relationship and substantially equally spaced apart between said ground electrode plates, means within said vessel distorting channelizing of emulsion as it enters the electric field, said emulsion flowing substantially horizontally through said electric field thereby allowing gravitation of water particles including water particles in minimal size.

9. An electrically energized deemulsifier as recited in claim 8; said means for distorting channeling of the emulsion comprising a scrubber plate fixed within said vessel adjacent the inlet extremity thereof, the lower extremity of said scrubber plate being spared from the bottom wall of said vessel, a plurality of apertures formed in the lower portion of said scrubber plate, an overflow discharge plate fixed within said vessel adjacent the outlet extremity thereof and having its upper extremity spaced from the top wall of said vessel, a plurality of apertures formed in the upper portion of said overflow discharge plate.

10. An electrically energized deemulsifier as recited in claim 9; said ground electrode plates being vertically curved and being substantially concentrically disposed within said vessel, said ground electrode plates being fixed to said scrubber plate and to said overflow discharge plate, said high voltage electrode plates being vertically curved and being substantially concentrically disposed within said vessel, a high voltage cylinder secured to said high voltage electrode and being longitudinally suspended centrally of said vessel and concentrically with said high voltage and ground electrode plates.

11. An electrically energized deemulsifier as recited in claim 8; means positively securing said high voltage electrode during shipment of said vessel, said securing means being removable to allow said high voltage electrode to be freely suspended within said vessel.

12. An electrically energized deemulsifier as recited in claim 11; said means for positively securing said high voltage electrode comprising a tube extending transversely through both said high voltage and ground electrode plates and being secured to said high voltage electrode plates and being spaced from said ground electrode plates, sleeve means extending through apertures formed in said vessel and engaging said high voltage electrode, a locking bar extending through said sleeve means and said tube, nut means received by at least one extremity of said locking bar and securing said locking bar said tube and said sleeve means in assembly.

* * * * *